Patented Sept. 10, 1935

2,013,840

UNITED STATES PATENT OFFICE 2,013,840

INTERNAL COMBUSTION ENGINE

Karl W. Pielicke, Detroit, Mich.

Application February 8, 1932, Serial No. 591,511

3 Claims. (Cl. 123—50)

This invention relates to internal combustion engines and the object of the invention is to provide an engine of the two cycle type having a pair of reciprocable pistons therein and arranged so that the combustion is produced between the pistons.

Another object of the invention is to provide an internal combustion engine in which the combustion chamber is completely scavenged during each cycle so that no unburned gases remain in the combustion chamber.

Another object of the invention is to provide an internal combustion engine of the two cycle type having a skirted outer piston and an inner piston reciprocably mounted within said outer piston, the chamber between the two pistons providing the combustion chamber of the engine.

Another object of the invention is to provide an engine of the character described in which the flow of air within the engine prevents the engine parts from over-heating.

A further object of the invention is to provide a light weight internal combustion engine in which the forces applied to the crank shaft are equalized.

These objects and the several novel features of the invention are hereinafter more fully described and claimed and the preferred form of construction by which these objects are attained is shown in the accompanying drawings in which—

Figure 1:
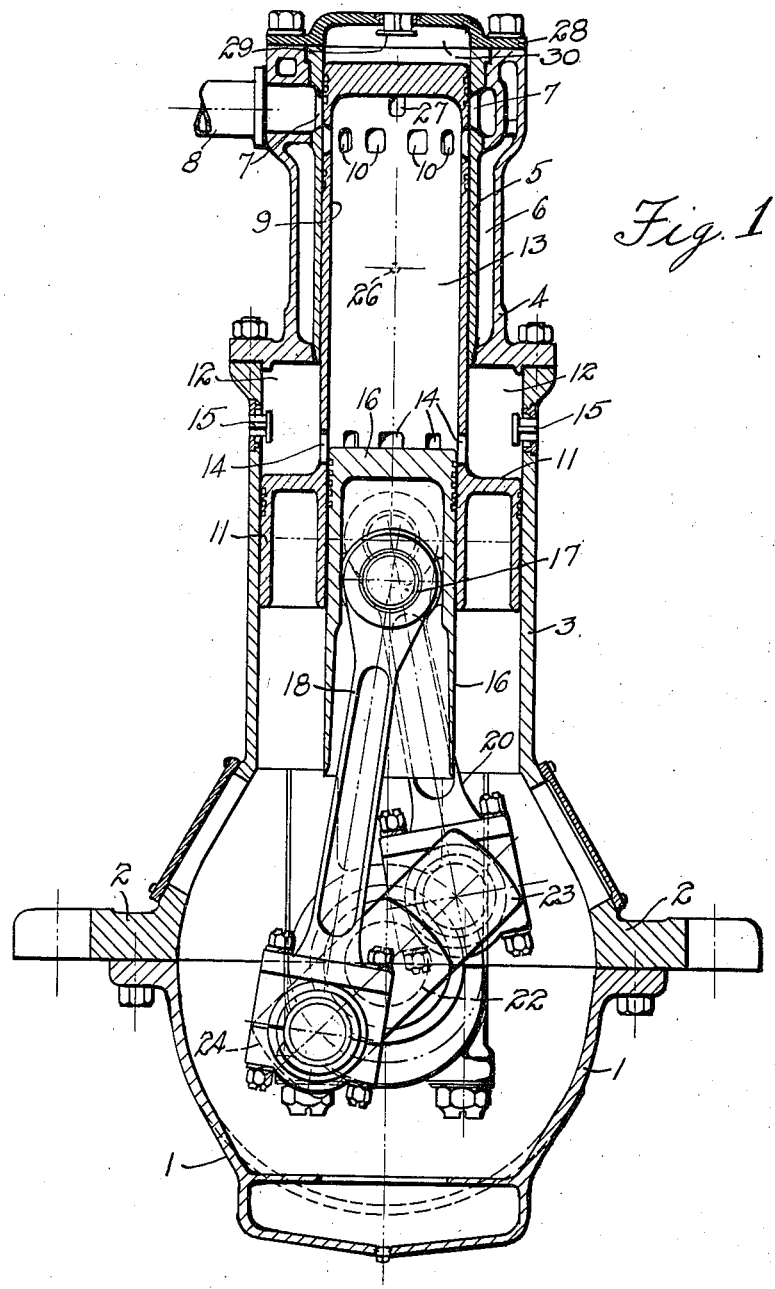
Fig. 1 is a section through an internal combustion engine embodying my invention.

The engine, as shown in Fig. 1, comprises two crank case portions 1 and 2. The cylinder 3 which is formed integrally with the crank case 2 is connected to an upper cylinder portion 4 which is provided with a cylinder sleeve 5 inserted therein. The space 6 between the cylinder sleeve 5 and the cylinder portion 4 provides a water jacket for cooling. The tubular cylinder 5 is provided with a series of exhaust ports 7 which are connected to a common outlet 8 shown in Fig. 1. The outer piston 9 is reciprocably mounted in the tubular cylinder 5 and is provided with a series of exhaust ports 10 at the upper end which are adapted to register with the exhaust ports 7 in the cylinder sleeve 5 during reciprocation of the piston. This piston 9 is provided with piston rings above and below the exhaust ports 10 as shown in Fig. 1 and at the lower end is provided with an enlarged skirt portion 11 which fits the inner diameter of the large cylinder 3. This skirt portion 11 is also provided with piston rings as shown and an annular chamber 12 is formed between the piston step 11 and the top of the cylinder 3, and communication is established between this chamber 12 and the combustion chamber 13 within the piston 9 by means of the intake ports 14 above the skirt portion 11 of the cylinder 9.

Figure 2:
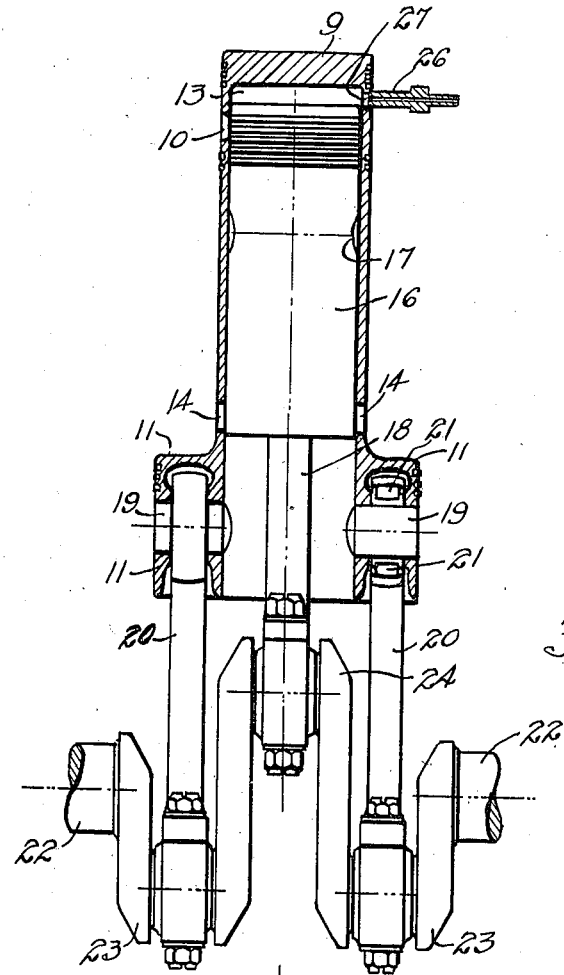
Fig. 2 is a side elevation in section of the crank shaft showing the inner and outer pistons assembled therewith.

The chamber 12 is provided with air inlet valves 15 which move to the open position upon reduction of pressure in the chamber 12 below atmospheric pressure and close upon increase of pressure in the chamber 12 above atmospheric pressure. Slidably mounted within the outer piston 9 is an inner piston 16 shown in Figs. 1 and 2 which is provided with piston rings as shown and with a wrist pin 17 on which the connecting rod 18 is pivotally mounted. As shown in Fig. 2, the skirt 11 of the piston 9 carries a pair of wrist pins 19 and a pair of connecting rods 20 are provided which are pivotally mounted on the piston pins 19 by means of the curved roller bearings 21.

Figure 3:
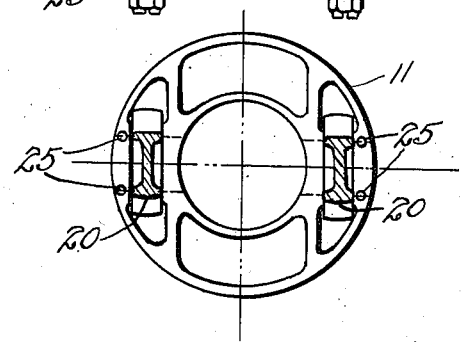
Fig. 3 is a bottom view of the outer piston with the connecting rods in section.

The crank shaft 22 is provided with a pair of crank portions 23 to which the lower ends of the connecting rods 20 are connected and diametrically opposite the crank portions 23, is a crank portion 24 to which the connecting rod 18 is connected as shown in Figs. 1 and 2. The lower end of the piston 9 is shown in Fig. 3 and dowel pins 25 are provided which lock the wrist pins 19 in place to prevent them from working into the cylinder formed within the piston 9. The holes for the dowel pins 25 are drilled into the piston in such a manner that the drill cuts into the outer surface of the wrist pin, as shown in Fig. 3. When the dowel pins 25 are inserted in these apertures, a portion of the dowel pin engages in the wrist pin and a portion engages in the piston thus preventing longitudinal movement of the wrist pin in the piston.

A fuel nozzle 26 extends through the cylinder wall 4 and sleeve 5 and terminates against the outer periphery of the piston 9. This fuel nozzle 26 is adapted to be uncovered by the port 27 in the piston 9 when this piston is moved to the position of highest compression. This position is illustrated in Fig. 2 and diagrammatically in Fig. 4. At this point a high air pressure is generated in the combustion chamber 13 and fuel is injected against this pressure through the fuel nozzle 26 as this nozzle is uncovered by the port 27.

Figure 4:
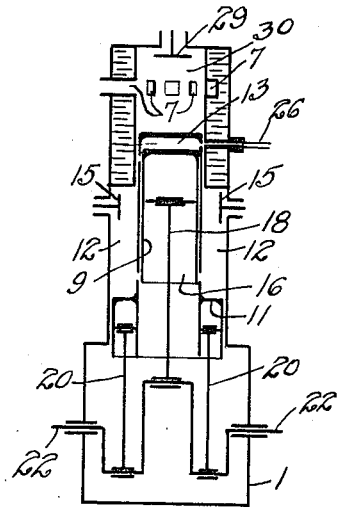
Fig. 4 is a diagrammatic view showing the position of the parts at the time that combustion takes place.
Figure 5:
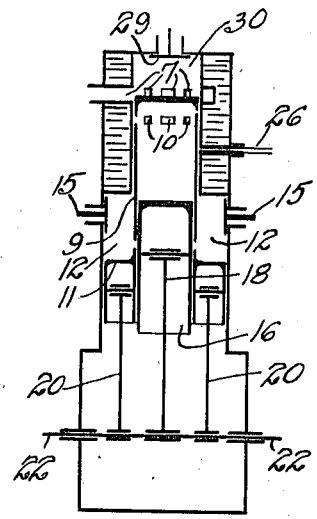
Fig. 5 is a similar diagrammatic view showing the parts midway of the power stroke.
Figure 6:
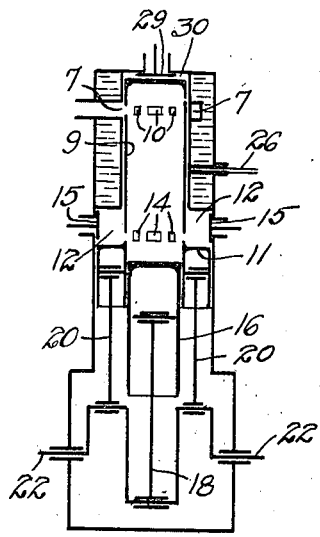
Fig. 6 is another similar view showing position of the parts at the completion of the power stroke.

During movement of the piston 9 to the position shown in Fig. 4, the annular chamber 12 has been enlarged and by reduction of pressure in this chamber air passes into the chamber 12 through the air inlet valves 15. Upon combustion, the piston 9 is driven upwardly and the piston 16 is driven downwardly. The position of the parts halfway of the combustion or explosion stroke is shown diagrammatically in Fig. 5. At this point the piston 16 has been driven downwardly by the power of combustion and the piston 9 has been driven upwardly and by means of the skirt 11 the pressure in the annular chamber 12 is increased to close the inlet valves 15 after which time, the pressure in this chamber continues to increase. As the power stroke is completed as shown diagrammatically in Fig. 6, the ports 10 in the piston 9 are moved to registration with the ports 7 at the top of the cylinder and the piston 16 moves downwardly to uncover the ports 14. As these ports 14 are uncovered, the fresh air in the chamber 12 which is under pressure rushes in and forces the burned gases in the combustion chamber 13 out through the ports 10 at the top of the combustion chamber. By this arrangement, the cool scavenging air which is heavier than the hot burned gases, enters the combustion chamber 13 at the bottom and forces the burned gases upwardly like a piston in a four cycle engine and outwardly through the ports 10 at the top of the combustion chamber.

Figure 7:
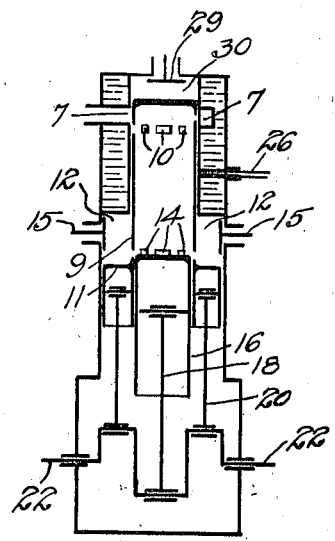
Fig. 7 is a view showing the position of the parts at the beginning of the compression stroke.

At the beginning of the compression stroke illustrated diagrammatically in Fig. 7, the piston 9 is moved downwardly to move the ports 10 therein out of registration with the ports 7 and the piston 16 is moved upwardly to close the ports 14. As the downward movement of the piston 9 continues, fresh air is again drawn into the chamber 12 and the fresh air within the combustion chamber 13 is compressed until the parts again reach the firing position shown in Fig. 4.

As shown in Figs. 1 and 2, the cranks of the crank shaft are diametrically opposite so that pressure is exerted on both opposite cranks at the same time during the combustion stroke thus equalizing the forces applied to the crank shaft and providing a balanced engine and reducing the vibrations. In other words, during the combustion stroke the connecting rods 20 are drawn upwardly while the connecting rod 18 is forced downwardly thus producing equalized pressures on the crank shaft and bearings. This provides an engine in which the combustion chamber is completely scavenged during each cycle and the volume of the chamber 12 is preferably considerably greater than the volume of the combustion chamber 13 to insure complete scavenging. The fresh air entering the engine tends to cool the parts below the water jacket and the water jacket cools the upper portion of the piston 9 on the outside while the cool air entering the combustion chamber cools the inside of the said piston and the top of the piston 16. An advantage attained by this engine is due to the low piston speeds as each piston travels only one-half of the complete stroke.

The operation of the engine has been described above as though the top of the cylinder were open. However, a cylinder head 28 may be provided as shown in Fig. 1 having an air intake valve 29 which is similar to the air intake valves 15 and which will open upon reduction of pressure in the chamber 30 below atmospheric pressure and which will close upon increase of pressure in the chamber 30 above atmospheric pressure. Upon downward movement of the piston 9 cool air is drawn into the chamber 30 through the valve 29 as will be understood from Figs. 1 and 4.

Upon succeeding upward stroke of the piston 9 the air in the chamber 30 is forced out through the exhaust ports 7. This movement of cool air cools the head of the piston 9 and cylinder sleeve 5 and also in passing out cools the exhaust ports 7 and exhaust conduit. As the size of this chamber 30 is increased by downward movement of the piston 9, shown in Fig. 4, fresh air is drawn into the chamber through the valve 29. Upon subsequent upward movement of the piston 9 pressure is produced in the chamber 30 but in order to produce this pressure an automatic shut-off valve may be provided in the exhaust conduit 8. As this pressure is increased by upward movement of the piston 9, fuel may be injected into the chamber 30 to produce combustion and provide a double action engine.

Having thus fully described my invention, its utility and mode of operation, what I claim and desire to secure by Letters Patent of the United States is—

1. In an internal combustion engine, a cylinder having a portion of small diameter and a portion of large diameter, a piston reciprocably mounted in the smaller portion of the cylinder, the piston being provided with a step fitting the larger portion of the cylinder and providing an air pressure chamber, the piston being also provided with a series of exhaust ports at the top and a series of inlet ports at the bottom above the step opening into the air pressure chamber, a crank shaft, piston rods connecting said piston with the crank shaft, the cylinder being provided with exhaust ports and the piston being movable to bring the exhaust ports of the piston to registration with the exhaust ports of the cylinder and a second piston reciprocably mounted in the first piston, the second piston being adapted to open or close the intake ports of the first piston, a connecting rod connecting the second piston to the crank shaft diametrically opposite the point of connection of the first connecting rods with the crank shaft, the arrangement being such that the pistons are moved in opposite directions and means for injecting fuel into the combustion chamber between the pistons at the point of highest compression.

2. In an internal combustion engine, a cylinder having portions of different diameter and provided with exhaust ports, a skirted piston reciprocably mounted in the cylinder, a second piston reciprocably mounted within the first piston, a crank shaft, means connecting the pistons to diametrically opposite sides of the crank shaft, the chamber between the pistons providing a combustion chamber and the chamber between the piston skirt and cylinder providing an air pressure chamber, air intake valves opening into said air pressure chamber, intake ports for the combustion chamber opening into said air pressure chamber and exhaust ports for the combustion chamber adapted to register with the exhaust ports of the cylinder, the intake ports being opened by the second piston and a fuel nozzle terminating at the wall of the first piston and the first piston being provided with a fuel port adapted to be brought to registration with said fuel nozzle at the point of highest compression in the combustion chamber.

3. In an internal combustion engine, a cylinder having portions of different diameter and provided with exhaust ports at the top, a skirted piston reciprocably mounted in said cylinder, a second piston reciprocably mounted within the first piston, a crank shaft, the pistons being connected to diametrically opposite sides of the crank shaft to cause the pistons to move in opposite directions, the chamber between the pistons providing a combustion chamber and the chamber between the skirted piston and cylinder providing an air pressure chamber, air intake valves opening into said air pressure chamber, intake ports for the combustion chamber opening into said air pressure chamber and exhaust ports for the combustion chamber adapted to register with the exhaust ports of the cylinder, the intake ports being opened by the second piston and means for injecting fuel between the pistons at the point of highest compression.

KARL W. PIELICKE.